(12) United States Patent
McVittie

(10) Patent No.: US 10,382,732 B2
(45) Date of Patent: Aug. 13, 2019

(54) RESONANT MEMS MIRROR PARAMETER ESTIMATION

(71) Applicant: Microvision, Inc., Redmond, WA (US)

(72) Inventor: Patrick J. McVittie, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 69 days.

(21) Appl. No.: 15/646,401

(22) Filed: Jul. 11, 2017

(65) Prior Publication Data

US 2019/0020860 A1 Jan. 17, 2019

(51) Int. Cl.
*G02B 26/08* (2006.01)
*H04N 9/31* (2006.01)
*G02B 26/10* (2006.01)

(52) U.S. Cl.
CPC ....... *H04N 9/3194* (2013.01); *G02B 26/0833* (2013.01); *G02B 26/101* (2013.01); *H04N 9/3135* (2013.01); *H04N 9/3161* (2013.01)

(58) Field of Classification Search
CPC .............. H04N 9/3194; H04N 9/3135; H04N 9/3161; G09G 3/3426
USPC ........................................... 359/223.1
See application file for complete search history.

(56) References Cited

U.S. PATENT DOCUMENTS

2009/0256973 A1\* 10/2009 Bazzani ............... G09G 3/3426
348/744

\* cited by examiner

*Primary Examiner* — Euncha P Cherry
(74) *Attorney, Agent, or Firm* — Kevin D. Wills

(57) ABSTRACT

A resonant scanning mirror includes a sensor to provide position information. A parameter estimation circuit estimates parameters from the position information. The parameter estimation circuit includes wideband analog circuits that have poles far removed from the resonant frequency of the scanning mirror. The parameter estimation circuit also includes an analog-to-digital converter that samples at a high sample rate, and digital filters that exhibit near perfect linearity.

7 Claims, 11 Drawing Sheets

RESONANT MEMS MIRROR PARAMETER ESTIMATION

FIELD

The present invention relates generally to resonant systems, and more specifically to parameter estimation of resonant systems.

BACKGROUND

Resonant systems present familiar design challenges. When trying to control a resonant system at a peak of a resonant mode, a feedback control circuit is commonly employed to produce an excitation signal in an attempt to keep the system resonating at a particular frequency and phase. Components within the feedback control circuit can have differing characteristics that increase the design challenges. For example, components may have characteristics that drift with time, age, and temperature. Further, the resonant frequency and phase shift of the system may vary with time, age and temperature.

Scanning laser projectors are an example of a resonant system. Scanning laser projectors typically employ a resonant mirror that oscillates in at least one dimension. Scanning laser projectors may employ parameter estimation circuits to estimate operating parameters such as oscillation amplitude, phase shift, or period. Estimated parameters may then be used to estimate the physical position of the resonating mirror over time. The image resolution of scanning laser projectors is limited by the accuracy with which the position of the resonating mirror can be estimated. As the position estimation accuracy increases, pixels can be placed more densely during mirror oscillation, thereby increasing image resolution.

Parameter estimation circuits typically include analog circuits such as filters, comparators, and peak detectors. Analog filters suffer from variations is manufacturing, phase drift over temperature, and phase drift over frequency. Analog comparators suffer from manufacturing variation, threshold drift over temperature, and variable delay based on signal amplitude. Threshold variation and threshold drift stacks up with the analog filter phase drift to further limit the ability of a projector to accurately place pixels. Analog peak-detector circuits suffer from the same disadvantages as analog filters and additionally suffer from aliasing, accuracy, and ripple problems. Variations in manufacturing result in complicated calibration steps which limit unit throughput and add manufacturing expense. Accordingly, the drawbacks of typical parameter estimation circuits function to limit the resolution of scanning laser projectors since they limit the accuracy with which pixels can be placed on a projection surface.

DESCRIPTION OF EMBODIMENTS

Figure 1:
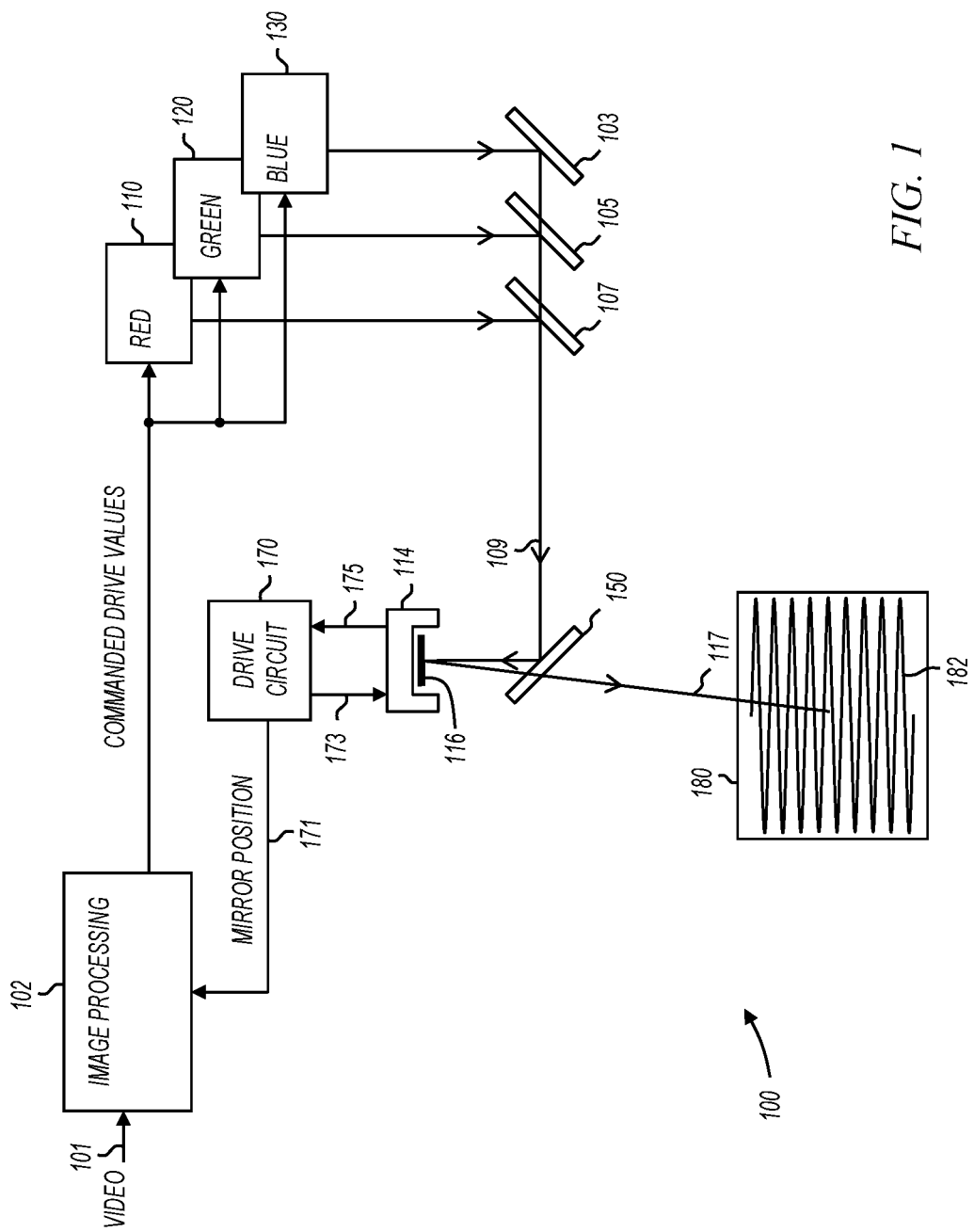
FIG. 1 shows a scanning laser projector in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanning laser projector in accordance with various embodiments of the present invention. Scanning laser projector 100 includes image processing component 102, red laser module 110, green laser module 120, and blue laser module 130. Light from the laser modules is combined with dichroics 103, 105, and 107 to produce combined laser beam 109. Scanning laser projector 100 also includes fold mirror 150, drive circuit 170, and MEMS device 114 with scanning mirror 116.

In operation, image processing component 102 processes video content at 101 using two dimensional interpolation algorithms to determine the appropriate spatial image content for each mirror position at which an output pixel is to be displayed. This content is then mapped to a commanded current for each of the red, green, and blue laser sources such that the output intensity from the lasers is consistent with the input image content. In some embodiments, this process occurs at output pixel rates in excess of 150 MHz.

In embodiments represented by FIG. 1, image processing component 102 receives a mirror position signal on node 171 from drive circuit 170. As described further below, drive circuit 170 receives feedback from MEMs device 114 describing the position of scanning mirror 116 and generates mirror position information on node 171. Increased accuracy of the mirror position information on node 171 allows image processing component 102 to place an increased number of pixels on a line of video, thereby increasing the resolution of the display. Various embodiments of the invention provide methods and apparatus to increase accuracy of the pixel position information, thereby allowing an increase in display resolution.

Combined laser beam 109 is directed onto an ultra-high speed gimbal mounted two-dimensional bi-axial laser scanning mirror 116. In some embodiments, this bi-axial scanning mirror is fabricated from silicon using MEMS processes. The vertical axis of rotation is operated quasi-statically and creates a vertical sawtooth raster trajectory. The vertical axis is also referred to as the slow-scan axis. The horizontal axis is operated on a resonant vibrational mode of the scanning mirror. In some embodiments, the MEMS device uses electromagnetic actuation, achieved using a miniature assembly containing the MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention. The horizontal resonant axis is also referred to as the fast-scan axis.

In some embodiments, raster scan 182 is formed by combining a sinusoidal component on the horizontal axis and a sawtooth component on the vertical axis. In these embodiments, output beam 117 sweeps back and forth left-to-right in a sinusoidal pattern, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the invention are not limited by the waveforms used to control the vertical and horizontal sweep or the resulting raster pattern.

A mirror drive circuit 170 provides a drive signal to MEMS device 114 on node 173. The drive signal includes an excitation signal to control the resonant angular motion of scanning mirror 116 on the fast-scan axis, and also includes a slow-scan drive signal to cause deflection on the slow-scan axis. The resulting mirror deflection on both the fast and slow-scan axes causes output beam 117 to generate a raster scan 182 in field of view 180. In operation, the laser light sources produce light pulses for each output pixel and scanning mirror 116 reflects the light pulses as beam 117 traverses the raster pattern.

Mirror drive circuit 170 also receives a feedback signal from MEMS device 114 on node 175. The feedback signal on node 175 provides information regarding the position of scanning mirror 116 on the fast-scan axis as it oscillates at a resonant frequency. In some embodiments, the feedback signal describes the instantaneous angular position of the mirror, and in other embodiments, the feedback signal describes the maximum deflection angle of the mirror, also referred to herein as the amplitude of the feedback signal.

In operation, drive circuit 170 excites resonant motion of scanning mirror 116 such that the amplitude of the mirror deflection is substantially constant. This provides for a constant maximum angular deflection on the fast-scan axis as shown in raster scan 182. Drive circuit 170 also provides mirror position information to image processing component 102 on node 171. As further described below, various embodiments of drive circuit 170 include parameter estimation circuits that provide increased accuracy of the mirror position information on node 171, thereby allowing for increased resolution in the projection display.

Drive circuit 170 may be implemented in hardware, a programmable processor, or in any combination. For example, in some embodiments, drive circuit 170 is implemented in an application specific integrated circuit (ASIC). Further, in some embodiments, some of the faster data path control is performed in an ASIC and overall control is provided by a software programmable microprocessor. Examples of drive circuit implementations are described further below.

Although red, green, and blue laser light sources are shown in FIG. 1, the various embodiments of the invention are not limited by the wavelength of light emitted by the laser light sources. For example, in some embodiments, non-visible light (e.g., infrared light) is emitted instead of, or in addition to, visible light.

Figure 2:
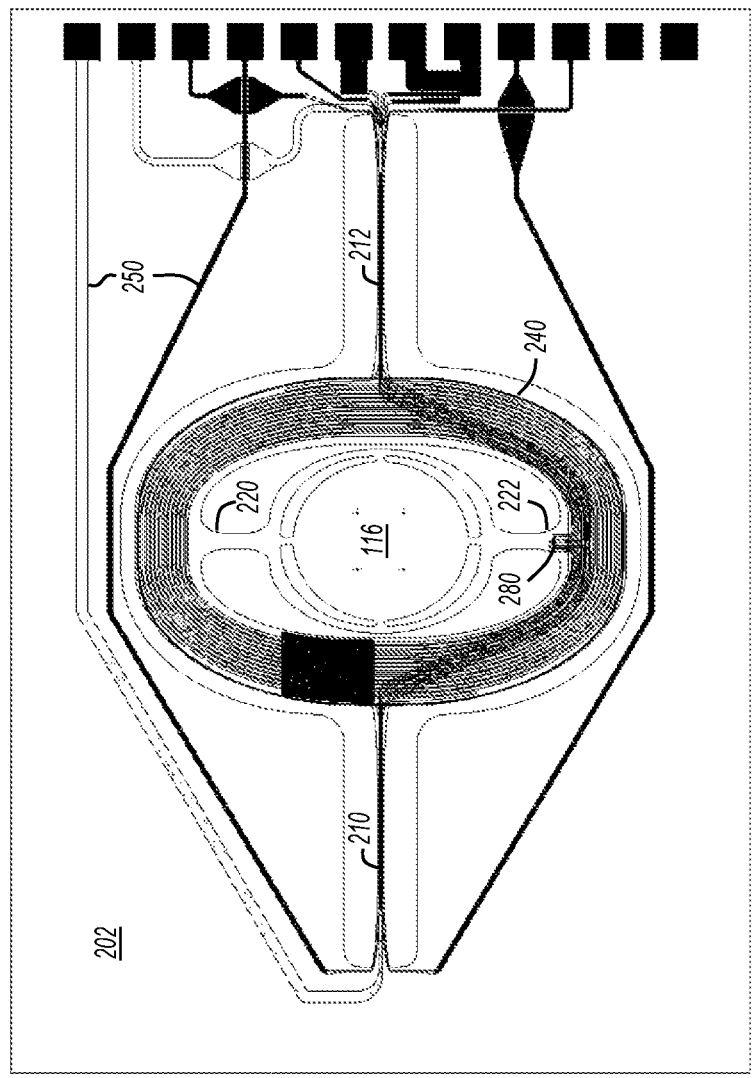
FIG. 2 shows a plan view of a microelectromechanical system (MEMS) device with a scanning mirror in accordance with various embodiments of the present invention.

FIG. 2 shows a plan view of a microelectromechanical system (MEMS) device with a scanning mirror. MEMS device 114 includes fixed platform 202, scanning platform 240, and scanning mirror 116. Scanning platform 240 is coupled to fixed platform 202 by flexures 210 and 212, and scanning mirror 116 is coupled to scanning platform 240 by flexures 220 and 222. Scanning platform 240 has a drive coil connected to drive lines 250, which are driven by a drive signal provided on node 173 from drive circuit 170 (FIG. 1). The drive signal includes an excitation signal to excite resonant motion of scanning mirror 116 on the fast-scan axis, and also includes a slow-scan drive signal to cause non-resonant motion of scanning platform 240 on the slow-scan axis. Current driven into drive lines 250 produces a current in the drive coil.

In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 240, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 210 and 212 form a pivot axis. Flexures 210 and 212 are flexible members that undergo a torsional flexure, thereby allowing scanning platform 240 to rotate on the pivot axis and have an angular displacement relative to fixed platform 202. Flexures 210 and 212 are not limited to torsional embodiments as shown in FIG. 2. For example, in some embodiments, flexures 210 and 212 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Scanning mirror 116 pivots on a first axis formed by flexures 220 and 222, and pivots on a second axis formed by flexures 210 and 212. The first axis is referred to herein as the horizontal axis or fast-scan axis, and the second axis is referred to herein as the vertical axis or slow-scan axis. The distinction between vertical and horizontal is somewhat arbitrary, since a rotation of the projection apparatus will cause a rotation of the two axes. Accordingly, the various embodiments of the present invention are not to be limited by the terms "horizontal" and "vertical."

In some embodiments, scanning mirror 116 scans at a mechanically resonant frequency on the horizontal axis resulting in a sinusoidal horizontal sweep. Further, in some embodiments, scanning mirror 116 scans vertically at a nonresonant frequency, so the vertical scan frequency can be controlled independently.

MEMS device 114 also incorporates one or more integrated piezoresistive position sensors. Piezoresistive sensor 280 produces a voltage that represents the displacement of mirror 116 with respect to scanning platform 240, and this voltage is provided as the feedback signal on node 175 (FIG. 1). As shown in FIG. 2, in some embodiments, position sensors are provided on one scan axis, although this is not a limitation of the present invention. For example, in some embodiments, MEMS device 114 includes a position sensor for both axes.

The particular MEMS device embodiment shown in FIG. 2 is provided as an example, and the various embodiments of the invention are not limited to this specific implementation. For example, any scanning mirror capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although MEMS device 114 uses a drive coil on a moving platform with a static magnetic field, other embodiments may include a magnet on a moving platform with drive coil on a fixed platform. Further, the mirror drive mechanism may include an electrostatic drive mechanism.

Figure 3:
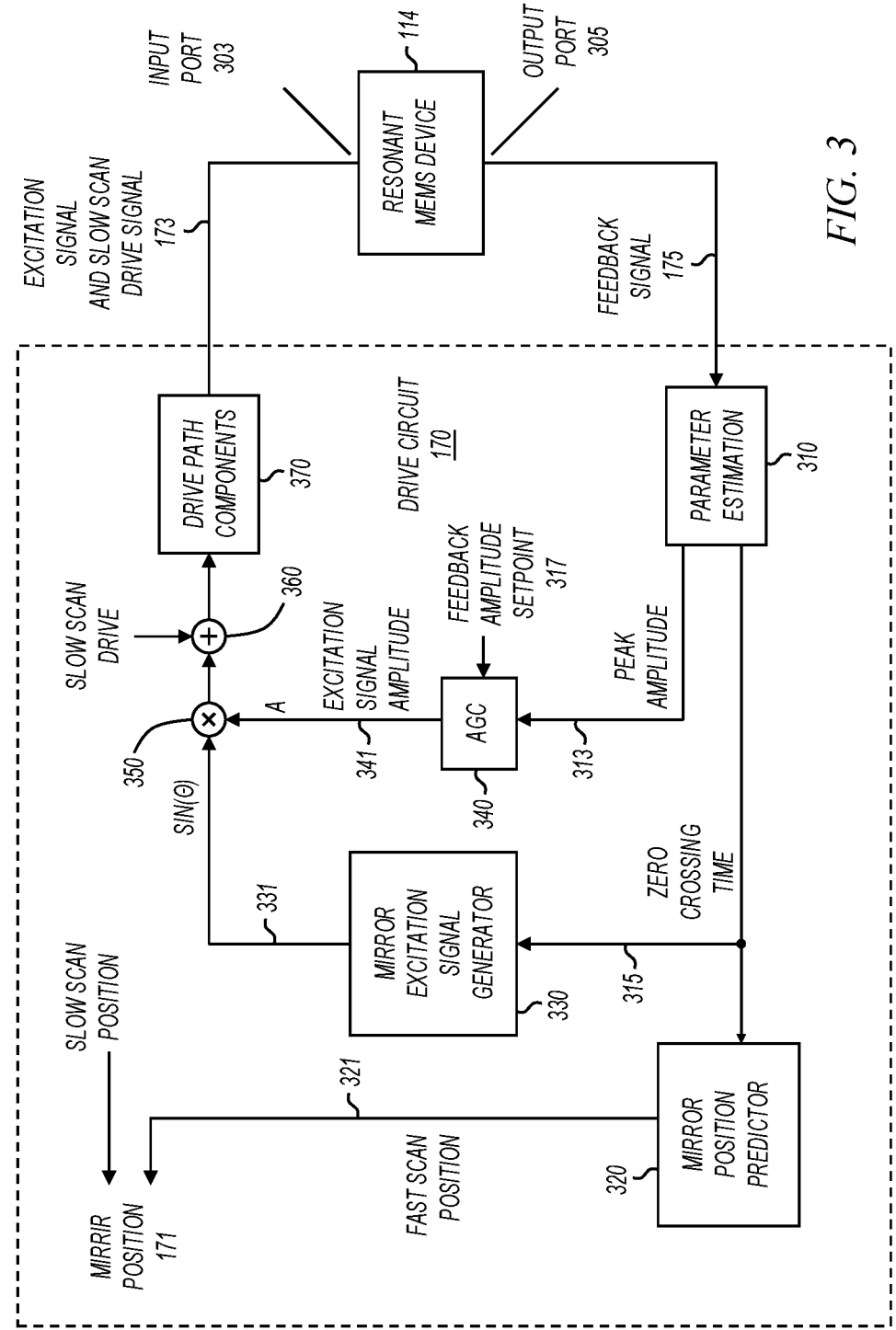
FIG. 3 shows a drive circuit and resonant MEMS device in accordance with various embodiments of the present invention.

FIG. 3 shows a drive circuit and resonant MEMS device in accordance with various embodiments of the present invention. Drive circuit 170 and resonant MEMS device 114 correspond to the same devices shown as part of scanning laser projector 100 (FIG. 1).

Resonant MEMS device 114 includes input port 303 and output port 305. Input port 303 is coupled to receive the drive signal on node 173, and output port 305 is coupled to provide the feedback signal on node 175. Input port 303 and output port 305 correspond to signal pads on MEMS device 114 (FIG. 2).

Drive circuit 170 includes parameter estimation circuits 310, automatic gain control (AGC) circuit 340, mirror position predictor 320, mirror excitation signal generator 330, multiplier 350, summer 360, and drive path components 370. Drive circuit 170 receives the feedback signal on node 175, and produces the drive signal on node 173 as well as the mirror position information 171.

In operation, parameter estimation circuits 310 receive the feedback signal from the resonant MEMS device and accurately estimate parameters of the feedback signal such as the peak amplitude and zero crossing time. The estimate of peak amplitude is provided on node 313 and the estimate of zero crossing time is provided on node 315. Parameter estimation circuits 310 provide highly accurate estimates of the peak amplitude and zero crossing time, thereby allowing for increased accuracy of mirror position prediction on the fast-scan axis and higher resolution image projection. An example embodiment of parameter estimation circuits 310 is described below with reference to later figures.

The drive signal on node 173 includes an excitation signal that excites resonant motion of MEMS device 114 on the fast-scan axis, and includes a slow-scan drive signal that controls motion on the slow-scan axis. The excitation signal that is part of the drive signal on node 173 is in the form of a synthesized tone having an amplitude and a phase, and can be expressed in the standard form of a sinusoid:

$$x(t) = A \sin(\theta) \tag{1}$$

where x(t) is the excitation signal, A is the amplitude of the excitation signal, and sin(θ) is a unit amplitude sinusoid having a phase θ as a function of time. θ can be represented as 2 πft+ϕ, where f is the frequency, and ϕ is the phase offset of the excitation signal.

The excitation signal frequency and phase are determined by mirror excitation signal generator 330 based on the zero crossing time 315 estimated by parameter estimation circuits 310. An example embodiment of mirror excitation signal generator 330 is described below with reference to later figures.

The excitation signal amplitude A on node 341 is controlled by an automatic gain control (AGC) loop that includes AGC circuit 340. AGC circuit 340 compares the peak amplitude information from parameter estimation circuits 310 to a feedback amplitude setpoint 317. Feedback amplitude setpoint 317 represents the desired constant amplitude value of the resonant operation of resonant MEMS device 114.

In response to the comparison between the peak amplitude and the setpoint, AGC circuit 340 produces an excitation signal amplitude on node 341. In general, when the feedback signal has an amplitude less than the setpoint, AGC circuit 340 increases the excitation signal amplitude, and when the feedback signal has an amplitude greater than the setpoint, AGC 340 circuit decreases the excitation signal amplitude. The bandwidth of this amplitude feedback loop is large enough, and the excitation signal amplitude step size is small enough, that the amplitude of feedback signal 175 remains substantially constant.

Multiplier 350 multiplies the excitation signal amplitude on node 341 with the unit amplitude excitation signal on node 331 to produce a digital excitation signal having an amplitude and phase. This digital excitation signal is summed with a slow-scan drive signal by summer 360, and the result is provided to drive path components 370, which produce the final analog drive signal on node 173. The final analog drive signal includes the slow-scan drive signal used to cause deflection of the mirror on the slow-scan axis as well as the excitation signal that causes resonant motion of resonant MEMS device 114. Drive path components 370 may include any suitable components, including a digital-to-analog converter (DAC), filters, amplifiers, and the like.

Mirror position predictor 320 receives the zero crossing time and produces a fast-scan position signal on node 321. The fast-scan position signal describes the instantaneous position of the resonant mirror on the fast-scan axis. The fast-scan position information is combined with slow-scan position information to provide the mirror position 171 to image processing components 102 (FIG. 1). As further described below, parameter estimation circuit 310 and mirror position predictor 320 provide a highly accurate prediction of mirror position that allows for increased accuracy of pixel placement and higher image resolution.

Figure 4:
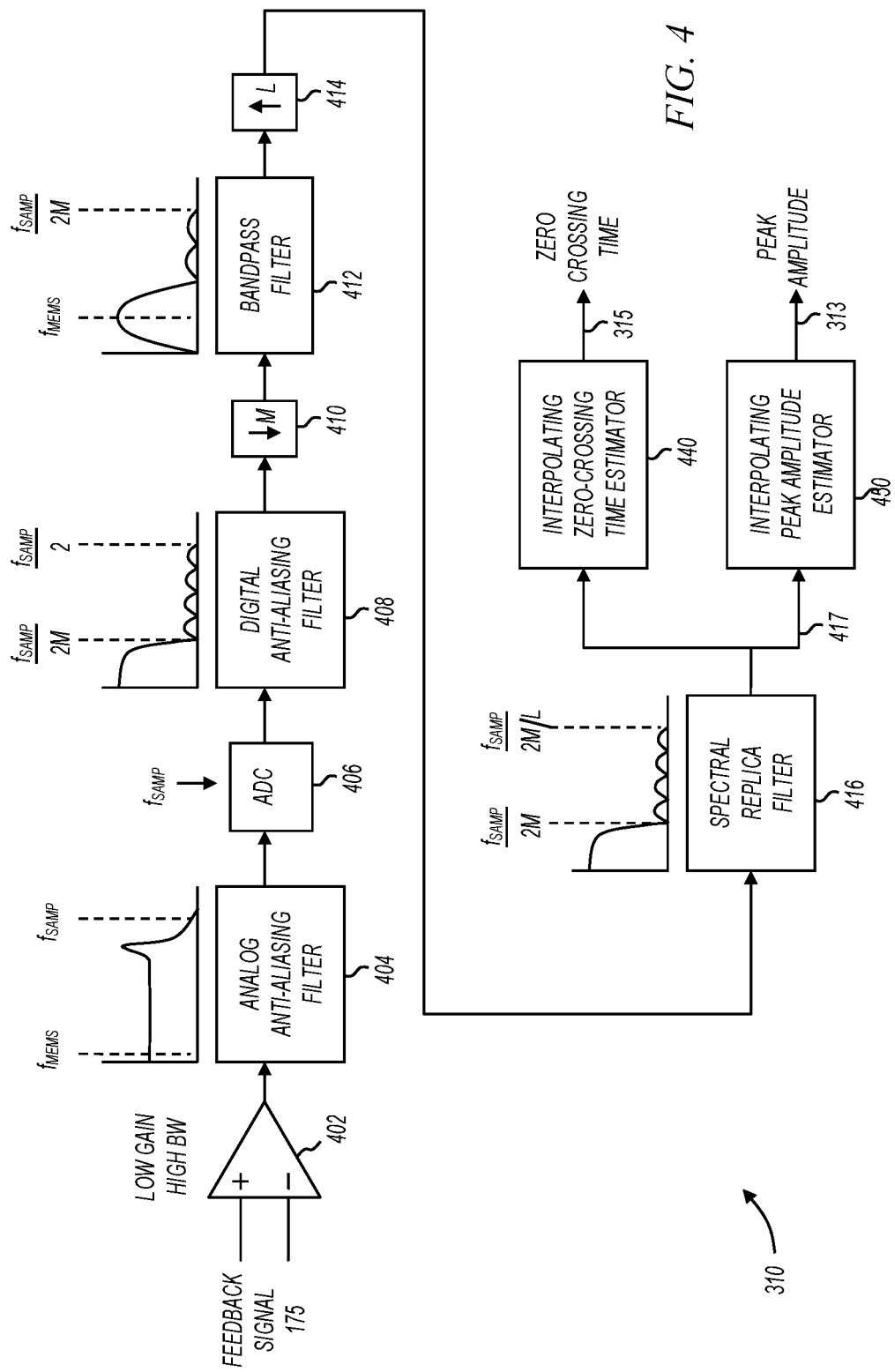
FIG. 4 shows a parameter estimation circuit in accordance with various embodiments of the present invention.

FIG. 4 shows a parameter estimation circuit in accordance with various embodiments of the present invention. Parameter estimation circuit 310 includes buffer 402, analog anti-aliasing filter 404, analog-to-digital converter (ADC) 406, digital anti-aliasing filter 408, down sampler 410, digital bandpass filter 412, up-sampler 414, digital spectral replica filter 416, interpolating zero-crossing time estimator 440, and interpolating peak amplitude estimator 450.

Parameter estimation circuit 310 includes various novel and nonobvious circuits and combinations of circuits that provide increased estimation accuracy of resonant mirror operating parameters resulting in increased image resolution. For example, various circuits reduce the effects of phase shifts as a function of time, age, temperature, and the like. Further, various circuits use interpolation techniques to estimate zero crossing times and peak amplitudes with high accuracy while minimizing hardware requirements. These and other novel and nonobvious aspects of parameter estimation circuit 310 are further described below.

Signal processing functions can generally be represented by transfer functions that include one or more "poles." A pole of a transfer function is a frequency for which the value of the denominator of the transfer function becomes zero. Values of poles in a transfer function determine whether the system is stable, and how well the system performs based on various metrics. The values of poles in analog circuits such as buffers, amplifiers, and filters are a function of the values of circuit elements, and as those circuit elements age and vary in temperature, the values of the poles may change. As the value of poles change, the phase of the system response may shift, and the effect of the phase shift is more pronounced if the pole is close to a frequency of interest. For example, if the frequency of interest is 30 kHz (near the mirror resonance) the phase shift caused by a changing pole at 1 MHz will have a greater effect than the phase shift caused by a changing pole at 4 MHz.

In terms of a scanning laser projector, phase shifts in the system response limit the ultimate image resolution that can be achieved, because the instantaneous position of the mirror on the fast-scan axis is limited by the accuracy of the phase estimate. As further described below, various circuits and combinations of circuits in parameter estimation circuit 310 reduce phase shifts and the effects of phase shifts in the system response, thereby increasing image resolution in the scanning laser projector.

Buffer 402 is a low gain, wide bandwidth differential buffer that receives the feedback signal on node 175. For example, in some embodiments, the gain of buffer 402 may be at or just below unity, and the bandwidth may be near or above 200 MHz. In some embodiments, the feedback signal is a differential signal generated by a piezoresistive sensor; however this is not a limitation of the present invention. For example, in some embodiments, the feedback signal is a non-differential signal.

The wide bandwidth and low gain of buffer 402 allows the poles of the buffer's transfer function to be far away in frequency from the mirror resonance, thereby significantly reducing the phase sensitivity of buffer 402 over both temperature and frequency. The output of buffer 402 is provided to analog anti-aliasing filter 404.

Analog anti-aliasing filter 404 is a wide bandwidth filter that further reduces the effects of phase shifts over temperature and also reduces the need for system calibration. In some embodiments, analog anti-aliasing filter 404 has a bandwidth much greater than the mirror resonance frequency. For example, in some embodiments, analog anti-aliasing filter 404 is a low pass filter having a 3 dB bandwidth of thirty times the mirror resonant frequency (e.g., 900 kHz for a mirror resonance at 30 kHz). In other embodiments, analog anti-aliasing filter has a bandwidth much greater than thirty times the resonant filter frequency.

Similar to wide bandwidth buffer 402, the poles of the transfer function of analog anti-aliasing filter 404 are pushed far away from the mirror resonance frequency to reduce the effects of phase shifts. Further, in some embodiments, the resonance of filter 404 is maximized (e.g., Q>=2) within the bounds of stability to further reduce the phase shift drift at the mirror resonance frequency. The resulting peaking of the filter comes at the cost of amplified noise but it is spectrally distinct from the signal and thus can be removed in the digital portion. Still further, analog anti-aliasing filter 404 is designed to allow aliasing at all frequencies except for a small band around the mirror resonance further pushing out the filter's poles. In the small band around the mirror resonance the suppression is only enough to suppress the largest mixing product or harmonic below the required signal-to-noise ratio.

The stop band suppression of the anti-aliasing filter is determined by equation (2), where $\sigma_\theta$ is the required phase jitter standard deviation given in degrees, $r_{Spur}$ is the ratio the ratio of the largest spurious spectral peak to the MEMS Amplitude, and $H_{AAA,Stop}$ is the ratio of stop band gain to pass band gain. This stopband suppression may be −30 dB in some instantiations. Equation (3) describes the frequency of the anti-aliasing filter resonance $f_{H,res}$ and bandwidth $f_H$, 3 dB as a function of the MEMS resonance $f_{MEMS}$, the drift of the filter resonance over temperature and voltage $\varepsilon_{Q,drift}$, and the filter resonance quality factor $Q_H$. The anti-aliasing filter resonance may be 900 kHz or greater in some instantiations to guarantee the desired phase stability. Equation (4) bounds the minimum sample rate to meet the design requirements given equation (2) and (3) for dual resonant pole anti-aliasing filter. Expanding equation (4) results in equation (5) which shows that the resonance quality factor can drastically reduce the required ADC sample rate. In some embodiments this ADC sample rate requirement could be 5 MHz. Reducing the ADC sample rate significantly reduces power and cost.

$$H_{AAA,Stop} \leq \frac{\pi \sigma_\theta}{180\sqrt{2} \cdot r_{spur}} \quad (2)$$

$$f_{H,3dB} > f_{H,res} \geq f_{MEMS} \frac{\varepsilon_{Q,drift} 180}{Q_H \sigma_\theta \pi} \quad (3)$$

$$f_{Samp} \geq \frac{f_{H,3dB}}{\sqrt{H_{AAA,Stop}}} \quad (4)$$

$$f_{Samp} \geq f_{MEMS} \frac{\varepsilon_{Q,drift} 180^{3/2} 2^{1/4} \sqrt{r_{spur}}}{Q_H \sigma_\theta^{3/2} \pi^{3/2}} \quad (5)$$

ADC 406 digitizes the filtered signal received from analog anti-aliasing filter 404. In some embodiments, ADC 406 significantly oversamples the signal to reduce the possibility of spectral replicas aliasing back down to the mirror resonance frequency. For example, in some embodiments, ADC 406 digitizes the filtered signal at 5.6 times the 3 dB frequency (also referred to as the cutoff frequency) of the analog anti-aliasing filter (e.g., >5 MHz for a filter bandwidth of 900 kHz). Further, in some embodiments, ADC 406 digitizes the filtered signal at greater than 5.6 times the filter bandwidth (e.g., 6.25 MHz for a filter bandwidth of 900 kHz). The total noise requirement after the ADC within the MEMS control bandwidth is given by equation (6), where $A_{MEMS}$ is the MEMS amplitude, $\sigma_\theta$ is the total phase noise, and $\sigma_n$ is the total noise. The quantization noise contribution to the total noise is given by equation (7) where $\sigma_{n,q}$ is the quantization noise, $V_{ADC,Range}$ is the ADC voltage range, $\Delta f_{MEMS}$ is the MEMS control bandwidth, $f_{Samp}$ is the ADC sample rate, and $B_{ADC,Eff}$ is the ADC's effective number of bits. Using equation (7) the effective number of bits is determined by equation (8). In some embodiments, the effective number of bits is at least 8 bits. Reducing the number of bits reduces system power and part cost.

$$\sigma_n \leq \frac{\pi A_{MEMS}\sigma_\theta}{180} \quad (6)$$

$$\sigma_{n,q} = \frac{V_{ADC,Range}2^{-B_{ABC,Eff}}\sqrt{\Delta f_{MEMS}}}{\sqrt{6f_{Samp}}} \quad (7)$$

$$B_{ADC,Eff} \geq -\log_2\left(\frac{\pi A_{MEMS}\sigma_\theta\sqrt{6f_{Samp}}}{180V_{ADC,Range}\sqrt{\Delta f_{MEMS}}}\right) \quad (8)$$

Parameter estimation circuit 310 includes a digital filter chain that suffers from no drift over temperature, is exact from unit to unit, and can be reconfigured with a simple change of software. The digital filter chain includes digital anti-aliasing filter 408, down-sampler 410, bandpass filter 412, up-sampler 414, and digital spectral replica filter 416. The digital filter chain is designed pass only spectral components of the MEMS oscillation while maximizing phase accuracy and minimizing memory and power.

Embodiments that include down-sampler 410 and up-sampler 414 are referred to herein as having a "down-up architecture." The down-up architecture reduces the number and precision of filter coefficients required for band pass filter 412. In some embodiments, the digital filters in the digital filter chain all exhibit near perfect linear phase which is impossible with analog filters. This results in a system in which phase drift is nearly independent of frequency. The down-up architecture is not a limitation of the present invention. For example, in some embodiments, down-sampler 410 and up-sampler 414 are omitted, and bandpass filter 412 includes more filter taps.

Digital anti-aliasing filter 408 reduces the signal bandwidth by rejecting much of the spectral content other than the resonant frequency band of the MEMS device. Any spectral replicas caused by analog anti-aliasing filter 404 are removed by digital anti-aliasing filter 408. Once the unwanted spectral content has been removed by digital anti-aliasing filter 408, the sample rate can be dropped down by a factor of M, where M is the down-sampling coefficient. In some embodiments, down-sampling is performed by decimation. For example, if M=10, 9 out of every 10 samples are dropped. Also for example, if M=8, 7 out of every 8 samples are dropped.

Because the sample rate has been reduced by a factor of M, fewer filter taps can be used to filter a longer time period. In some embodiments, bandpass filter 412 is optimized for the noise characteristics and how the PZR sensor in the MEMS device is modulating. The PZR doesn't stay at one frequency; it drifts around with temperature, which may be a function of laser light. The PZR jumps in frequency because it gets instantaneously heated, and the flexures of the MEMS device change the resonant frequency. In some embodiments, bandpass filter 412 has a very narrow notch that passes only the bandwidth with which the MEMS is being modulated. Because of the narrow notch, bandpass filter 412 sets the noise bandwidth of the entire filter chain. To achieve a sharp falloff, bandpass filter 412 needs to be as long in time as possible. Accordingly, embodiments that include down-sampler 410 can have fewer filter taps for any given filter notch characteristic.

Up-sampler 414 increases the number of samples by L. In some embodiments, up-sampling is accomplished by interpolation, and in other embodiments, up-sampling is accomplished by inserting zeros valued samples. For example, if L=4, three zero valued samples may be inserted between each sample. Also for example, if L=8, seven zero valued samples may be inserted between each sample. Up-sampling by inserting zero valued samples introduces higher frequency spectral replicas. Digital spectral replica filter 416 removes the spectral replicas that are introduced in the up-sampling process. The output of digital spectral replica filter 416 is provided to interpolating zero crossing time estimator 440 and interpolating peak amplitude estimator 450.

Interpolating zero crossing time estimator 440 determines the phase of the scanning mirror on the fast-scan axis by tracking zero crossings of the PZR. The output is a time of zero crossing on node 315 but since the mirror frequency is precisely known the time measurement is equivalent to a phase estimate. Advantages over analog comparators include reduced threshold drifts and delay which is highly insensitive to amplitude. In some embodiments, interpolating zero-crossing time estimator 440 interpolates between time samples to determine the time at which the signal crosses the zero point. Interpolating zero-crossing estimator is described more fully below with reference to later figures.

Interpolating peak amplitude estimator 450 estimates the peak amplitude and provides it on node 313. In some embodiments, interpolating peak amplitude estimator 450 performs a three point quadratic fit to find the peak amplitude. Advantages over analog peak detectors include reduced temperature effects and the elimination of temperature effects. Interpolating peak amplitude estimator 450 is described more fully below with reference to later figures.

Figure 5:
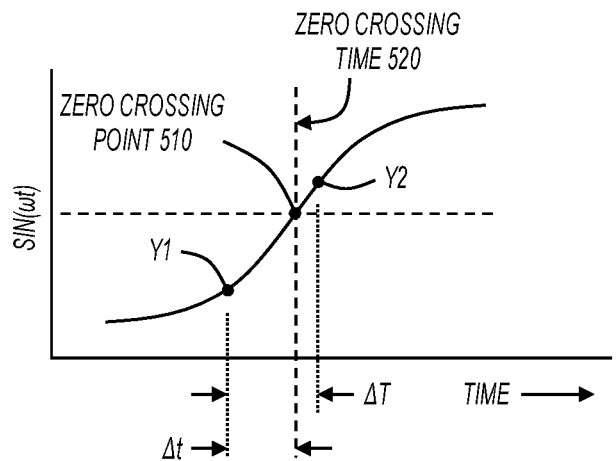
FIG. 5 shows the operation of a digital interpolated zero-crossing estimator in accordance with various embodiments of the present invention.

FIG. 5 shows the operation of a digital interpolating zero-crossing estimator in accordance with various embodiments of the present invention. In some embodiments, the digital interpolating zero crossing estimator is implemented using a processor that executes instructions. An example implementation is described further below with reference to FIG. 8.

As shown in FIG. 5, two points $(y_1, y_2)$ are known, where the two points are on either side of the zero-crossing point 510. In operation, interpolating zero-crossing estimator provides an estimate of zero crossing time 520.

The two points $(y_1, y_2)$ can be represented by equations (9)-(13), where points $(y_1, y_2)$ have a time separation of $\Delta T$:

$$y_1 = A\sin(\theta) \tag{9}$$

$$-A\sin(\omega\Delta T) \le y_1 \le 0 \tag{10}$$

$$y_2 = A\sin(\omega\Delta T + \theta) \tag{11}$$

$$0 < y_2 \le A\sin(\omega\Delta T) \tag{12}$$

$$A\sin(\omega\Delta T) \le |y_2 - y_1| \le 2\sin\left(\frac{\omega\Delta T}{2}\right) \tag{13}$$

The time $\Delta t$ between $y_1$ and the zero crossing time is:

$$\Delta t = \frac{\sin^{-1}\left(\frac{y1}{A}\right)}{\sin^{-1}\left(\frac{y2}{A}\right) - \sin^{-1}\left(\frac{y1}{A}\right)} \Delta T, \tag{14}$$

and can be estimated as $\hat{\Delta t}$:

$$\hat{\Delta t} = \frac{y1}{y2 - y1} \Delta T. \tag{15}$$

The interpolating zero crossing estimator then estimates the zero crossing time 520 as the time of point $y_1$ plus the estimate $\hat{\Delta t}$.

The error $e$ in the estimate of the zero crossing time is:

$$e = \hat{\Delta t} - \Delta t, \tag{16}$$

which expands to:

$$e = \left(\frac{y1}{y2 - y1} - \frac{\sin^{-1}\left(\frac{y1}{A}\right)}{\sin^{-1}\left(\frac{y2}{A}\right) - \sin^{-1}\left(\frac{y1}{A}\right)}\right) \Delta T. \tag{17}$$

Expressing $y_2$ as a function of $y_1$ yields:

$$y2 = A\sin\left(\omega\Delta T + \sin^{-1}\left(\frac{y1}{A}\right)\right), \tag{18}$$

and substituting (11) for $y_2$ in (10) yields:

$$e = \left(\frac{y1}{A\sin\left(\omega\Delta T + \sin^{-1}\left(\frac{y1}{A}\right)\right) - y1} - \frac{\sin^{-1}\left(\frac{y1}{A}\right)}{\omega\Delta T}\right) \Delta T, \tag{19}$$

which expresses the error $e$ as a function of a single variable $y_1$.

Normalizing the value for $y_1$ yields:

$$y'_1 = \frac{y1}{A}, \tag{20}$$

and substituting into (12) yields:

$$e = \left(\frac{y1' * \frac{1}{R*30 \text{ kHz}}}{\sin\left(\frac{2\pi}{R} + \sin^{-1}(y1')\right) - y1'} - \frac{\sin^{-1}(y1')}{2\pi * 30 \text{ kHz}}\right), \tag{21}$$

which is an expression for normalized error where $y'_1$ satisfies the inequality:

$$-\sin\left(\frac{2\pi}{R}\right) \le y1' \le 0. \tag{22}$$

Figure 6:
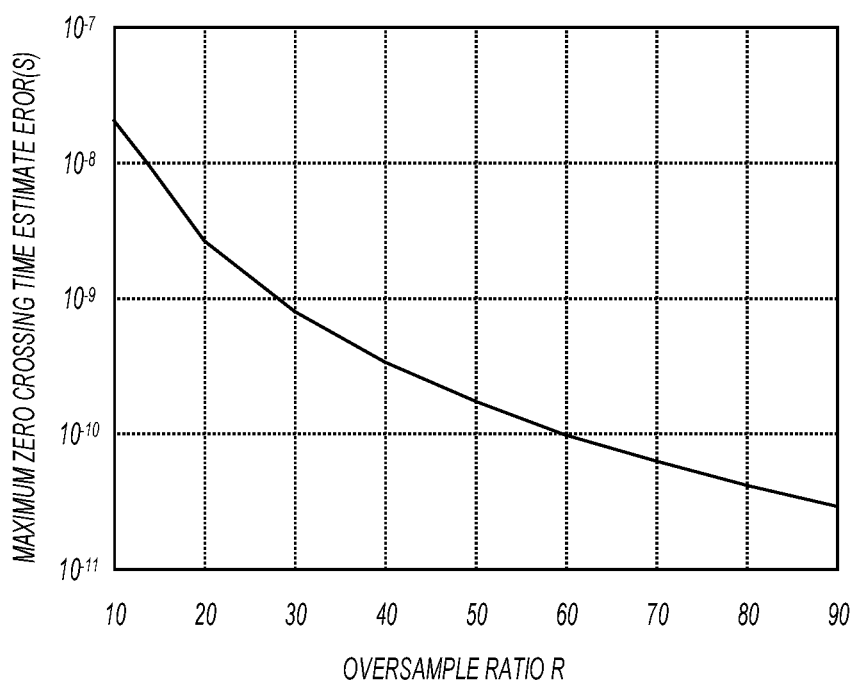
FIG. 6 shows zero crossing time estimate error as a function of oversample ratio in accordance with various embodiments of the present invention.

FIG. 6 shows zero crossing time estimate error as a function of oversample ratio in accordance with various embodiments of the present invention. The oversample ratio R is equal to the sample rate divided by M and multiplied by L (FIG. 4) all divided by the MEMS resonant frequency. A large value of M reduces the number of required filter coefficients and memory storage for bandpass filter 412 (FIG. 4). As shown in FIG. 6, estimate error decreases as the oversample ration increases.

Figure 7:
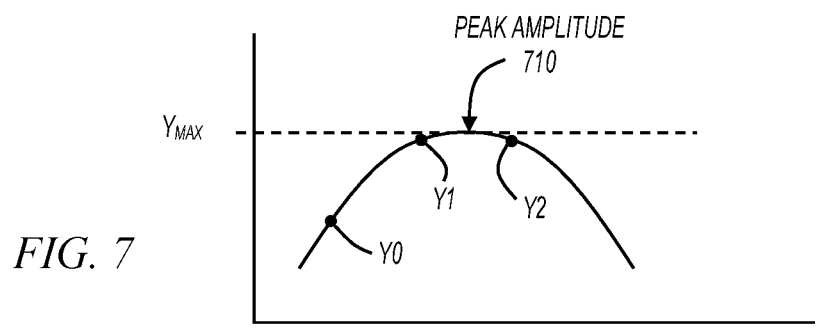
FIG. 7 shows the operation of a digital interpolated peak detector in accordance with various embodiments of the present invention.

FIG. 7 shows the operation of an interpolating peak amplitude estimator in accordance with various embodiments of the present invention.

The error of a Taylor series Approximation is always less than the next term in the sequence.

$$\cos(x) = 1 - \frac{x^2}{2!} + \frac{x^4}{4!} + \frac{x^6}{6!} + \cdots \tag{23}$$

$$\text{error} = \left|1 - \frac{x^2}{2!} - \cos(x)\right| \le \left|\frac{x^4}{4!}\right| \tag{24}$$

The error is monotonic with distance from x=0 and thus the maximum error point is the furthest point from x=0. Given k+1 points there is one and only one polynomial of order k which will interpolate those points. The three point Lagrange Polynomial is given as follows:

$$L_2(x) = c_2 x^2 + c_1 x^1 + c_0 = y_0 \frac{(x-x_1)(x-x_2)}{(x_0-x_1)(x_0-x_2)} + y_1 \frac{(x-x_0)(x-x_2)}{(x_1-x_0)(x_1-x_2)} + y_2 \frac{(x-x_0)(x-x_1)}{(x_2-x_0)(x_2-x_1)} \tag{18}$$

Given a function that is well approximated by a second order polynomial we only need three points along that curve to fully constrain the polynomial.

Fermat's Theorem:

Let f: (a, b)→$\mathfrak{R}$ be a function and suppose that $x_e \in$(a, b) is a point where f has a local extremum. If f is differentiable at $x_e$, then f'($x_e$)=0.

Estimator Derivation

Solving the following equation will find the maximum/minimum point, $$L'_2(x_e) = \tag{25}$$

$$y_0 \frac{2x_e - x_1 - x_2}{(x_0-x_1)(x_0-x_2)} + y_1 \frac{2x_e - x_0 - x_2}{(x_1-x_0)(x_1-x_2)} + y_2 \frac{2x_e - x_0 - x_1}{(x_2-x_0)(x_2-x_1)}.$$

Given that the samples are evenly spaced in time and time shift and time scaling do not affect the amplitude, the following simplification can be made:

$$x_0 = -1, x_1 = 0, x_2 = 1. \tag{26}$$

This problem simplifies to:

$$0 = y_0 \frac{2x_e - 1}{2} - y_1 \frac{2x_e}{1} + y_2 \frac{2x_e + 1}{2} \tag{27}$$

or $$x_e = \frac{y_0 - y_2}{2(y_0 - 2y_1 + y_2)} \tag{28}$$

The value at the extrema point can be found by plugging this value into the Lagrange Polynomial, but first a simplification is made using the same time-shift and time scaling as above, $$L_2(x) = \frac{y_0 x(x-1) - 2y_1(x+1)(x-1) + y_2 x(x+1)}{2} \tag{29}$$

$$L_2(x) = \frac{y_0 x^2 y_0 x - 2y_1 x^2 + 2y_1 + y_2 x^2 + y_2 x}{2} \tag{30}$$

$$L_2(x) = \frac{(y_0 - 2y_1 + y_2)x^2 + (y_2 - y_0)x + 2y_1}{2} \tag{31}$$

Note how the dependence on x vanishes, this means that the time shift and time scaling have no effect on the maximum approximation.

$$L_2(x_e) = \frac{\frac{(y_0 - y_2)^2}{4(y_0 - 2y_1 + y_2)} - \frac{(y_0 - y_2)^2}{2(y_0 - 2y_1 + y_2)} + 2y_1}{2} \tag{32}$$

$$L_2(x_e) = \frac{(y_0 - y_2)^2}{8(y_0 - 2y_1 + y_2)} - \frac{(y_2 - y_0)^2}{4(y_0 - 2y_1 + y_2)} + y_1 \tag{33}$$

$$L_2(x_e) = \frac{-(y_0 - y_2)^2}{8(y_0 - 2y_1 + y_2)} + y_1 \tag{34}$$

Estimator Bias Bound

To bound the error, the Taylor series error bound can be used with the knowledge that the furthest x point can be no further than two samples away from x=0 since the three points straddle x=0. The maximum distance is then simply a function of the over sample ratio R of the sinusoid. The error bound reduces at $1/R^4$ which is quite fast. It should be noted that the average bias value is far smaller still.

Maximum Error Bound:

$$|e_A| \leq A \frac{\left(\frac{2\pi}{R}\right)^4}{24} = \frac{2\pi^4 A}{3R^4} \tag{35}$$

The expected value of the error with respect to the sample offset is:

$$E\{e_A\} = E\{A - L_2(x_e)\} \tag{36}$$

$$y_n A \cos\left(\frac{2\pi}{R}(x_n - x_e)\right) \tag{37}$$

$$E\{A - L_2(x_e)\} = \int_{-1}^{1} \left(A - \frac{-(y_0 - y_2)^2}{8(y_0 - 2y_1 + y_2)} - y_1\right) \frac{1}{2} dx_e \tag{38}$$

$$E\{A - L_2(x_e)\} = \tag{39}$$

$$A \int_{-1}^{1} \left(1 + \frac{\left(\cos\left(\frac{2\pi}{R}(-1 - x_e)\right) - \cos\left(\frac{2\pi}{R}(1 - x_e)\right)\right)^2}{8\left(\begin{array}{c}\cos\left(\frac{2\pi}{R}(-1 - x_e)\right) - 2\cos\left(\frac{2\pi}{R}(0 - x_e)\right) + \\ \cos\left(\frac{2\pi}{R}(1 - x_e)\right)\end{array}\right)} - \cos\left(\frac{2\pi}{R}(0 - x_e)\right)\right) \frac{1}{2} dx_e$$

$$E\{A - L_2(x_e)\} = A - A \frac{-2R\sin\left(\frac{2\pi}{R}\right)^2 + R\cos^2\left(\frac{2\pi}{R}\right)\left(\begin{array}{c}\log\left(\cos\left(\frac{\pi}{R}\right) - \sin\left(\frac{\pi}{R}\right)\right) - \\ \log\left(\cos\left(\frac{\pi}{R}\right) + \sin\left(\frac{\pi}{R}\right)\right) + \sin\left(\frac{2\pi}{R}\right)\end{array}\right)}{4\pi} \tag{40}$$

Evaluating the above expression for R=100 results in a bias of $A 2.6 \times 10^{-7}$, which can be considered zero in any practical application. This result shows that the estimator can be considered an unbiased estimator for sufficiently large oversample ratios R.

Estimator Variance

Random variable errors can be added in for each of the three points in the approximation to estimate the bias. Since the band pass filter will highly correlate the errors between samples they will all have essentially the same value and thus will cancel each other out.

$$L_2(x_e) = \frac{-(y_0 + n_0 - y_2 - n_2)^2}{8(y_0 + n_0 - 2y_1 - 2n_1 + y_2 + n_2)} + y_1 + n_1 \tag{41}$$

$$L_2(x_e) \cong \frac{-(y_0 - y_2)^2}{8(y_0 - 2y_1 + y_2)} + y_1 + n_1 \tag{42}$$

The expected variance of the amplitude estimator is then the input noise density multiplied by the root filter bandwidth.

$$STD\{L_2(x_e)\} \cong \sigma_n \sqrt{\frac{BW_{bandpass}}{\frac{1}{2} f_S}} . \tag{43}$$

In addition the input ADC quantization noise is given by:

$$\sigma_{n,Q} = \frac{LSB}{\sqrt{12}} . \tag{44}$$

Based on the quantization of the ADC, the estimated variance is expected to be:

$$STD\{L_2(x_e)\} \cong LSB\sqrt{\frac{BW}{6f_S}}. \qquad (45)$$

Cramer-Rao-Lower-Bound (CRLB)

The CRLB for finding the amplitude of a sinusoid in noise given N number of points is well known:

$$\text{Var}\{\hat{A}\} \geq \frac{2\sigma_n^2}{N}. \qquad (46)$$

To make a comparison, the points are converted into bandwidth using the following relation which states that the bandwidth of a bandpass filter must be larger than twice the reciprocal of the filter length in time. Note that a low pass or high pass filter has half the bandwidth of the bandpass version.

$$BW_{bandpass} \geq \frac{2}{T_{filt}} \qquad (47)$$

Normalizing by the sample rate converts the time period to number of samples.

$$\frac{BW_{bandpass}}{f_S} \geq \frac{2}{T_{filt}f_S} = \frac{2}{N} \qquad (48)$$

Substituting and making the comparison yields $$\text{Var}\{\hat{A}\} \geq \frac{2\sigma_n^2}{N} = \sigma_n^2 \frac{BW_{bandpass}}{f_S}. \qquad (49)$$

$$\frac{STD\{L_2(x_e)\}}{STD_{CRLB}\{\hat{A}\}} = \sqrt{2} \qquad (50)$$

Note that the three point peak estimator is $\sqrt{2}$ worse than the CRLB. This missing half can be recovered with the estimator by adding a second channel with an orthogonal bandpass filter. The average of both estimates will result in the CRLB variance.

$$\frac{STD\{\frac{1}{2}L_2(x_e) + \frac{1}{2}L_2^*(x_e)\}}{STD_{CRLB}\{\hat{A}\}} = 1 \qquad (51)$$

Figure 8:
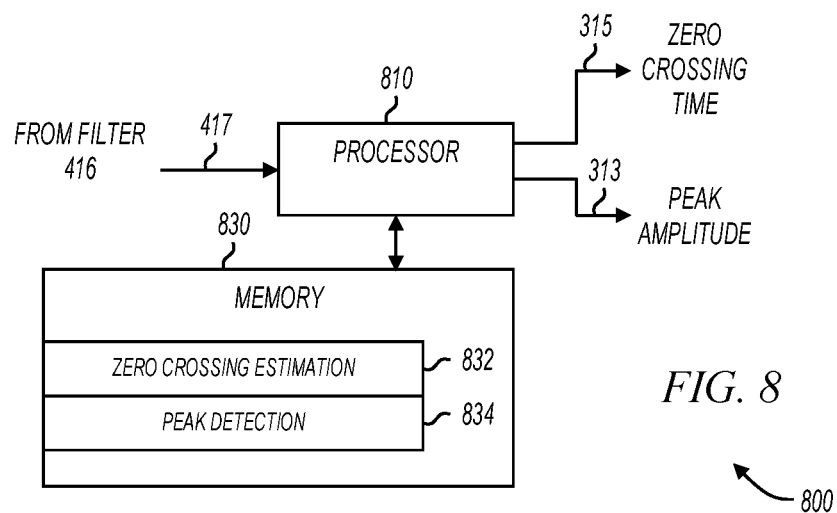
FIG. 8 shows a processing circuit in accordance with various embodiments of the present invention.

FIG. 8 shows a processing circuit in accordance with various embodiments of the present invention. Processor circuit 800 may implement either or both of interpolating zero-crossing time estimator 440 and interpolating peak amplitude estimator 450. Processor circuit 800 includes processor 810 and memory 820. Memory 820 represents a non-transitory computer-readable medium that stores instructions. When zero-crossing estimation instructions 832 are executed, processor 810 performs the zero crossing estimation described above with reference to FIG. 5. When peak detection instructions 834 are executed, processor 810 performs the peak detection estimation described above with reference to FIG. 7.

Processor 810 may be any type of processor capable of executing instructions and performing mathematical calculations. For example, processor 810 may be a microprocessor, a digital signal processor, or the like. Memory 820 may be any type of memory capable of non-transitory storage of processor instructions. For example, memory 820 may a volatile or nonvolatile semiconductor storage device such as static random access memory or FLASH memory. Memory 820 may also include magnetic or optical storage.

In some embodiments, system 800 includes graphics processor(s), field programmable gate array(s) (FPGA), and/or application specific integrated circuit(s) to perform some or all of the described functions.

Figure 9:
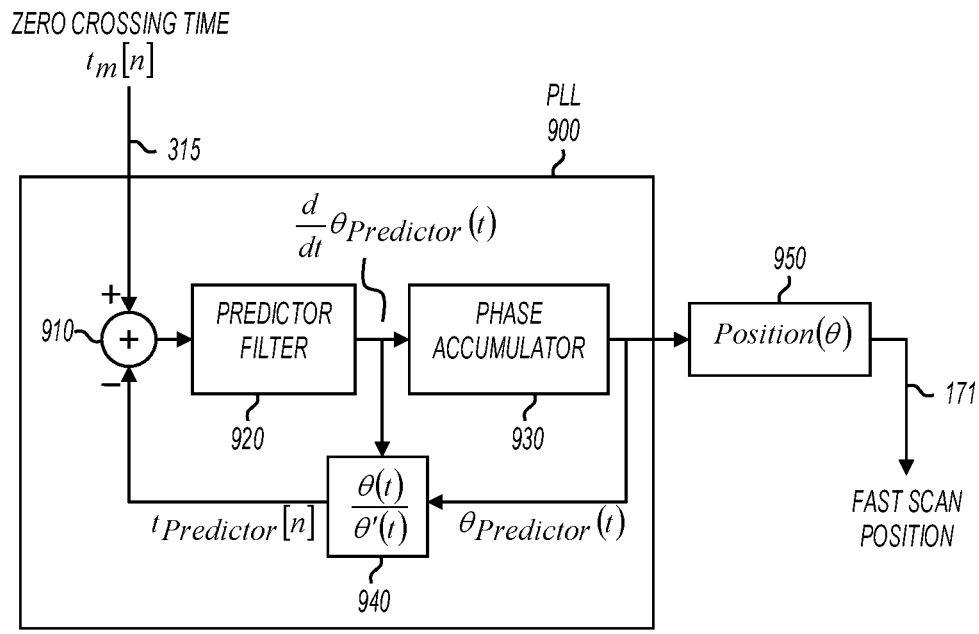
FIG. 9 shows a mirror position prediction circuit in accordance with various embodiments of the present invention.

FIG. 9 shows a mirror position prediction circuit in accordance with various embodiments of the present invention. Mirror position prediction circuit 320 includes subtractor 910, predictor filter 920, phase accumulator 930, divider 940, and position calculator 950.

Mirror position prediction circuit 320 receives the zero crossing time estimate from interpolating zero-crossing time estimator 440 (FIG. 4), and produces an estimate of the mirror position on the fast-scan axis at 171. The mirror position is determined from a predicted phase value $\theta_{Predictor}$ (t) generated by a digital phase locked loop (PLL) 900 by means of adjusting a phase increment that is accumulated to match the zero-crossing timing of the resonant MEMS device feedback.

In operation, subtractor 910 measures a time difference between the zero crossing time estimate provided on node 315 and the zero crossing time estimate $t_{Predictor}$[n] produced by PLL 900. A predictor filter 920 produces a phase increment $$\frac{d}{dt}\theta_{Predictor}(t)$$

as a function of the time difference, and provides the phase increment to phase accumulator 930.

PLL 900 synthesizes a phase value $\theta_{Predictor}$ (t) that changes every clock cycle. Phase accumulator 930 creates $\theta_{Predictor}$ (t) by summing the phase increment $$\frac{d}{dt}\theta_{Predictor}(t)$$

each clock cycle. The rate of change of $\theta_{Predictor}$ (t) is modified by predictor filter 920 based on the output of summer 910 to track the frequency of the resonant mode of resonant MEMS device 114. The internal zero crossing time estimate $t_{Predictor}$[n] is produced by divider 940, which divides the phase value $\theta_{Predictor}$ (t) by the phase increment $$\frac{d}{dt}\theta_{Predictor}(t).$$

The output of PLL 900 is input to position generator 950 to determine the position of the mirror based on the predicted phase $\theta_{Predictor}$ (t). In some embodiments, position generator 950 implements a CORDIC algorithm, although this is not a limitation of the present invention. For example, a look up table may be used to map phase values to mirror position.

Figure 10:
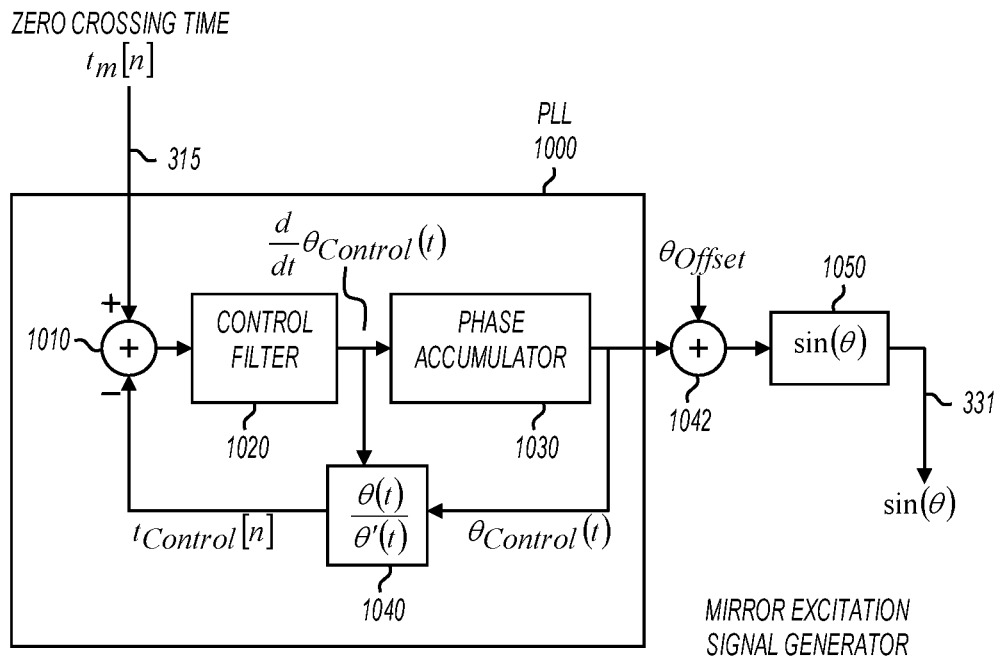
FIG. 10 shows a mirror excitation signal generation circuit in accordance with various embodiments of the present invention.

FIG. 10 shows a mirror excitation signal generation circuit in accordance with various embodiments of the present invention. Mirror excitation signal generator 330 includes subtractor 1010, control filter 1020, phase accumulator 1030, divider 1040, summer 1042, and sin function 1050.

Mirror excitation signal generator 330 receives the zero crossing time estimate from interpolating zero-crossing time estimator 440 (FIG. 4), and produces the fast-scan excitation signal sin(θ). The frequency of the excitation signal sin(θ) is controlled by a digital phase locked loop (PLL) 1000 by means of adjusting a phase increment that is accumulated to match the zero-crossing timing of the resonant MEMS device feedback. The instantaneous phase of the excitation signal is determined by the PLL as offset by a static phase offset $\theta_{Offset}$.

In operation, subtractor 1010 measures a time difference between the zero crossing time estimate provided on node 315 and the zero crossing time estimate $t_{Control}[n]$ produced by PLL 1000. This allows the system to track the resonant frequency at which resonant MEMS device 114 is operating.

PLL 1000 synthesizes a phase value $\theta_{Control}(t)$ that changes every clock cycle. PLL 1000 includes phase accumulator 1030 that sums a phase increment $$\frac{d}{dt}\theta_{Control}(t)$$

for each clock cycle to create $\theta_{Control}(t)$. The rate of change of this phase value sets the frequency of the excitation signal. The rate of change of $\theta_{Control}(t)$ is modified by control filter 1020 based on the output of summer 1010 to track the frequency of the resonant mode of resonant MEMS device 114. The internal zero crossing time estimate $t_{Control}[n]$ is produced by divider 1040, which divides the phase value $\theta_{Control}(t)$ by the phase increment $$\frac{d}{dt}\theta_{Control}(t).$$

Summer 1042 sums a static phase offset $\theta_{Offset}$ to the phase $\theta_{Control}(t)$ output from PLL 1000. In some embodiments, the static phase offset is determined during manufacture or calibration of the system and is performed once. For example, drive path components 370 (FIG. 3) may include filters, amplifiers, and other circuit components that impart a phase delay to the excitation signal. These phase delays may be characterized on a static basis and the static phase offset may be used to offset the effects of these and other phase delays in the system.

The output of summer 1042 is input to sin wave generator 1050 to produce a sinusoid having instantaneous phase θ, which is equal to the sum of $\theta_{Control}(t)$ and $\theta_{Offset}$. In some embodiments, sin wave generator 1050 implements a CORDIC algorithm, although this is not a limitation of the present invention. For example, a look up table may be used to map phase values to sin values. The result is the unit amplitude excitation signal sin(θ) which corresponds to the sinusoid of eq. (1) with a normalized amplitude.

Figure 11:
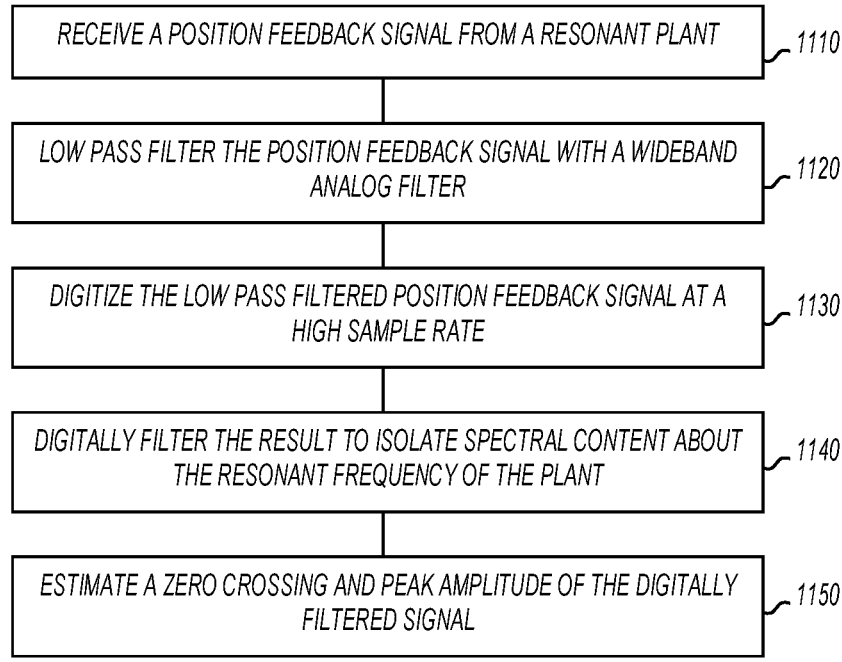
FIGS. 11 and 12 show flow diagrams of methods in accordance with various embodiments of the present invention.

FIG. 11 shows a flow diagram of methods in accordance with various embodiments of the present invention. In some embodiments, method 1100, or portions thereof, is performed by a drive circuit that controls a resonant plant such as a resonant MEMS device. In other embodiments, method 1100 is performed by a series of circuits or an electronic system such as a parameter estimation circuit or system. Method 1100 is not limited by the particular type of apparatus performing the method. The various actions in method 1100 may be performed in the order presented, or may be performed in a different order. Further, in some embodiments, some actions listed in FIG. 11 are omitted from method 1100.

Method 1100 is shown beginning with block 1110. As shown at 1110, a position feedback signal is received from a resonant plant. In some embodiments, the resonant plant may be a resonant scanning mirror, such as scanning mirror 116, which is part of MEMS device 114 (FIGS. 1, 2). The feedback signal may produced by any type of position sensor. For example, in some embodiments, the position feedback signal may be produced by a piezoresistive sensor such as sensor 280 (FIG. 2).

At 1120, the position feedback signal is low pass filtered with a wideband analog filter. In some embodiments the filter may be a resonant filter with a quality factor Q greater than two. Further, in some embodiments, the 3 dB bandwidth of the filter may be significantly higher than the spectral content of the position feedback signal that represents the resonant frequency of the resonant plant. For example, the 3 dB bandwidth may be ten time the resonant frequency, 30 times the resonant frequency, or higher. By filtering with a wideband analog anti-aliasing filter, phase shift effects caused by transfer function poles are reduced.

At 1130, the low pass filtered position feedback signal is digitized at a high sample rate. As used herein, the term "high sample rate" refers to any rate greater than twice the highest frequency content in the signal being sampled. For example, in some embodiments, the sample rate is greater than five times the 3 dB bandwidth of the analog anti-aliasing filter.

At 1140, the digitized signal is digitally filtered to isolate spectral content about the resonant frequency of the plant. In some embodiments, the digital signal is digitized by a digital filter chain such as the digital filter chain shown in FIG. 4.

At 1150, a zero crossing time and peak amplitude of the digitally filtered signal are estimated. In some embodiments, this corresponds to the operation of interpolating zero-crossing time estimator 440 and interpolating peak amplitude estimator 450 (FIG. 4).

Figure 12:
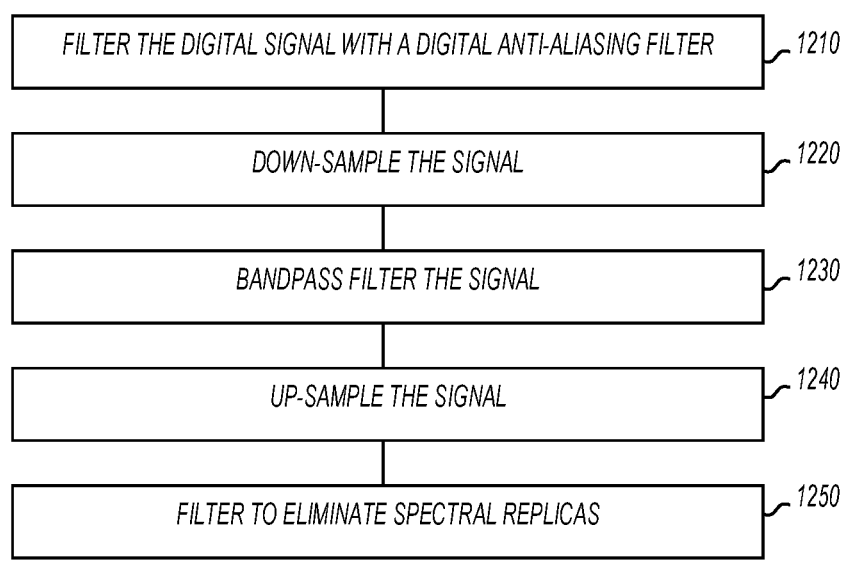

FIG. 12 shows a flow diagram of methods in accordance with various embodiments of the present invention. In some embodiments, method 1140, or portions thereof, is performed by digital filter chain, such as the digital filter chain shown as part of parameter estimation circuit 310, embodiments of which are shown in previous figures. In other embodiments, method 1140 is performed by a series of circuits or an electronic system. Method 1140 is not limited by the particular type of apparatus performing the method. The various actions in method 1140 may be performed in the order presented, or may be performed in a different order. Further, in some embodiments, some actions listed in FIG. 12 are omitted from method 1140.

Method 1140 is shown beginning with block 1210. As shown at 1210, a digital signal is filtered with a digital anti-aliasing filter. In some embodiments, this corresponds to the operation of digital anti-aliasing filter 408 (FIG. 4). At 1220, the signal is down-sampled. In some embodiments, this corresponds to the operation of down-sampler 410 (FIG. 4). At 1230, the signal is bandpass filtered. In some embodiments, this corresponds to the operation of bandpass filter 412 (FIG. 4). At 1240, the signal is up-sampled. In some embodiments, this corresponds to the operation of up-sampler 414 (FIG. 4). At 1250, the signal is filtered to eliminate any spectral replicas that may have been introduced by the up-sampling process. In some embodiments, this corresponds to the operation of spectral replica filter 416.

Figure 13:
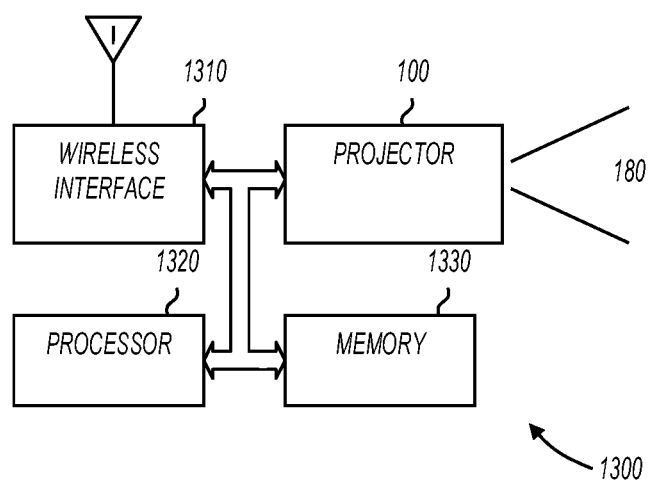
FIG. 13 shows a block diagram of a mobile device in accordance with various embodiments of the present invention.

FIG. 13 shows a block diagram of a mobile device in accordance with various embodiments of the present invention. As shown in FIG. 13, mobile device 1300 includes wireless interface 1310, processor 1320, memory 1330, and scanning laser projector 100. Scanning laser projector 100 includes parameter estimation circuits as described above.

Scanning laser projector 100 may receive image data from any image source. For example, in some embodiments, scanning laser projector 100 includes memory that holds still images. In other embodiments, scanning laser projector 100 includes memory that includes video images. In still further embodiments, scanning laser projector 100 displays imagery received from external sources such as connectors, wireless interface 1310, a wired interface, or the like.

Wireless interface 1310 may include any wireless transmission and/or reception capabilities. For example, in some embodiments, wireless interface 1310 includes a network interface card (NIC) capable of communicating over a wireless network. Also for example, in some embodiments, wireless interface 1310 may include cellular telephone capabilities. In still further embodiments, wireless interface 1310 may include a global positioning system (GPS) receiver. One skilled in the art will understand that wireless interface 1310 may include any type of wireless communications capability without departing from the scope of the present invention.

Processor 1320 may be any type of processor capable of communicating with the various components in mobile device 1300. For example, processor 1320 may be an embedded processor available from application specific integrated circuit (ASIC) vendors, or may be a commercially available microprocessor. In some embodiments, processor 1320 provides image or video data to scanning laser projector 100. The image or video data may be retrieved from wireless interface 1310 or may be derived from data retrieved from wireless interface 1310. For example, through processor 1320, scanning laser projector 100 may display images or video received directly from wireless interface 1310. Also for example, processor 1320 may provide overlays to add to images and/or video received from wireless interface 1310, or may alter stored imagery based on data received from wireless interface 1310 (e.g., modifying a map display in GPS embodiments in which wireless interface 1310 provides location coordinates).

Figure 14:
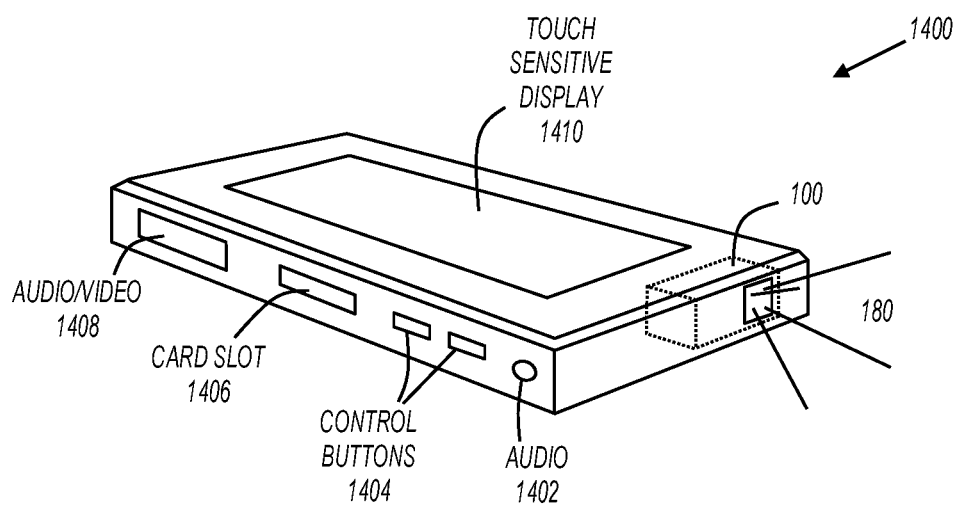
FIG. 14 shows a mobile device in accordance with various embodiments of the present invention.

FIG. 14 shows a mobile device in accordance with various embodiments of the present invention. Mobile device 1400 may be a hand held scanning laser projector with or without communications ability. For example, in some embodiments, mobile device 1400 may be a scanning laser projector with little or no other capabilities. Also for example, in some embodiments, mobile device 1400 may be a device usable for communications, including for example, a cellular phone, a smart phone, a tablet computing device, a global positioning system (GPS) receiver, or the like. Further, mobile device 1400 may be connected to a larger network via a wireless (e.g., cellular), or this device can accept and/or transmit data messages or video content via an unregulated spectrum (e.g., WiFi) connection.

Mobile device 1400 includes scanning laser projector 100, touch sensitive display 1410, audio port 1402, control buttons 1404, card slot 1406, and audio/video (A/V) port 1408. None of these elements are essential. For example, mobile device 1400 may only include scanning laser projector 100 without any of touch sensitive display 1410, audio port 1402, control buttons 1404, card slot 1406, or A/V port 1408. Some embodiments include a subset of these elements. For example, an accessory projector may include scanning laser projector 100, control buttons 1404 and A/V port 1408. A smartphone embodiment may combine touch sensitive display device 1410 and projector 100.

Touch sensitive display 1410 may be any type of display. For example, in some embodiments, touch sensitive display 1410 includes a liquid crystal display (LCD) screen. In some embodiments, display 1410 is not touch sensitive. Display 1410 may or may not always display the image projected by scanning laser projector 100. For example, an accessory product may always display the projected image on display 1410, whereas a mobile phone embodiment may project a video while displaying different content on display 1410. Some embodiments may include a keypad in addition to touch sensitive display 1410.

A/V port 1408 accepts and/or transmits video and/or audio signals. For example, A/V port 1408 may be a digital port, such as a high definition multimedia interface (HDMI) interface that accepts a cable suitable to carry digital audio and video data. Further, A/V port 1408 may include RCA jacks to accept or transmit composite inputs. Still further, A/V port 1408 may include a VGA connector to accept or transmit analog video signals. In some embodiments, mobile device 1400 may be tethered to an external signal source through A/V port 1408, and mobile device 1400 may project content accepted through A/V port 1408. In other embodiments, mobile device 1400 may be an originator of content, and AN port 1408 is used to transmit content to a different device.

Audio port 1402 provides audio signals. For example, in some embodiments, mobile device 1400 is a media recorder that can record and play audio and video. In these embodiments, the video may be projected by scanning laser projector 100 and the audio may be output at audio port 1402.

Mobile device 1400 also includes card slot 1406. In some embodiments, a memory card inserted in card slot 1406 may provide a source for audio to be output at audio port 1402 and/or video data to be projected by scanning laser projector 100. Card slot 1406 may receive any type of solid state memory device, including for example secure digital (SD) memory cards.

Figure 15:
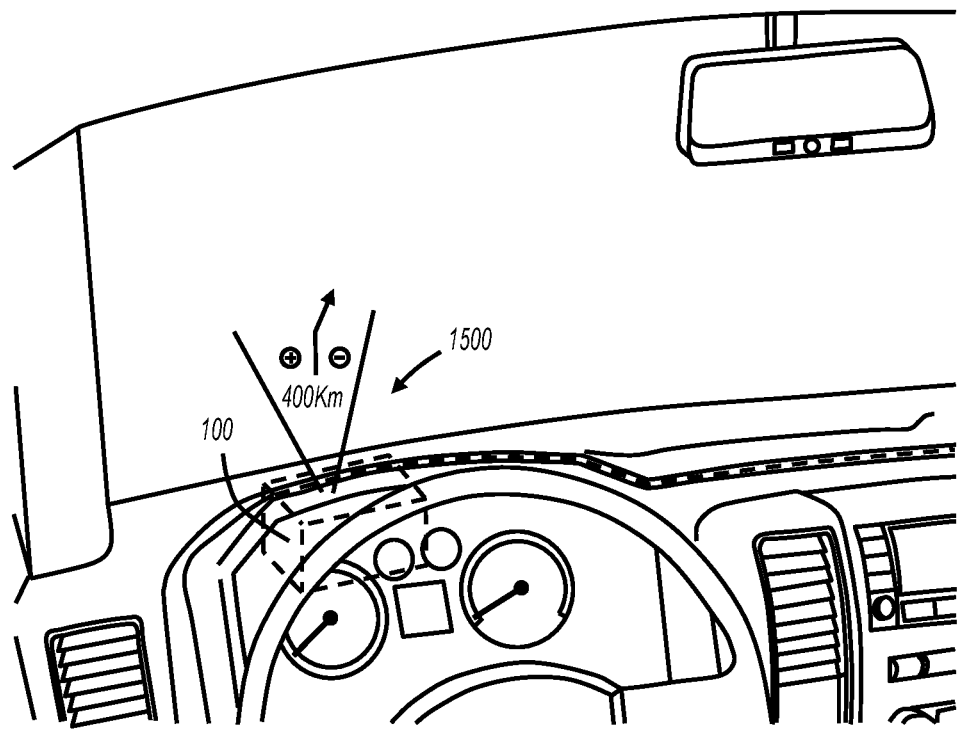
FIG. 15 shows a head-up display system in accordance with various embodiments of the present invention.

FIG. 15 shows a head-up display system in accordance with various embodiments of the invention. Projector 100 is shown mounted in a vehicle dash to project the head-up display at 1500. Although an automotive head-up display is shown in FIG. 15, this is not a limitation of the present invention. For example, various embodiments of the invention include head-up displays in avionics application, air traffic control applications, and other applications.

Figure 16:
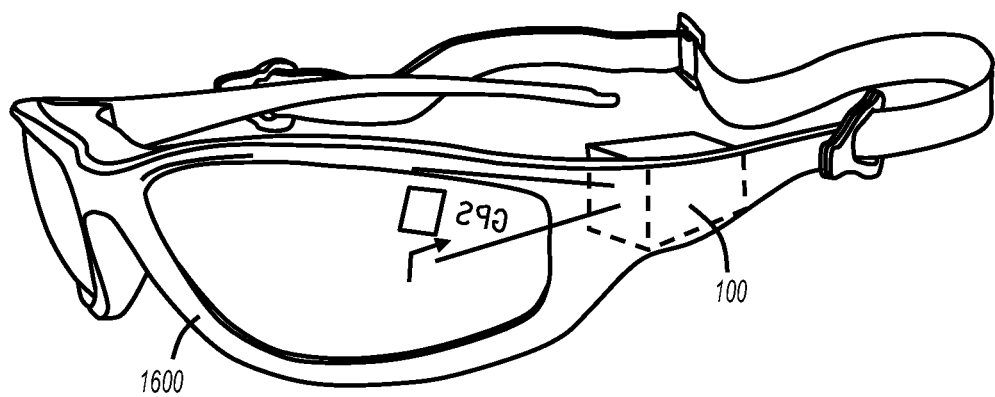
FIG. 16 shows eyewear in accordance with various embodiments of the present invention.

FIG. 16 shows eyewear in accordance with various embodiments of the invention. Eyewear 1600 includes projector 100 to project a display in the eyewear's field of view. In some embodiments, eyewear 1600 is see-through and in other embodiments, eyewear 1600 is opaque. For example, eyewear 1600 may be used in an augmented reality application in which a wearer can see the display from projector 100 overlaid on the physical world. Also for example, eyewear 1600 may be used in a virtual reality application, in which a wearer's entire view is generated by projector 100.

Although only one projector 100 is shown in FIG. 16, this is not a limitation of the present invention. For example, in some embodiments, eyewear 1600 includes two projectors; one for each eye.

Figure 17:
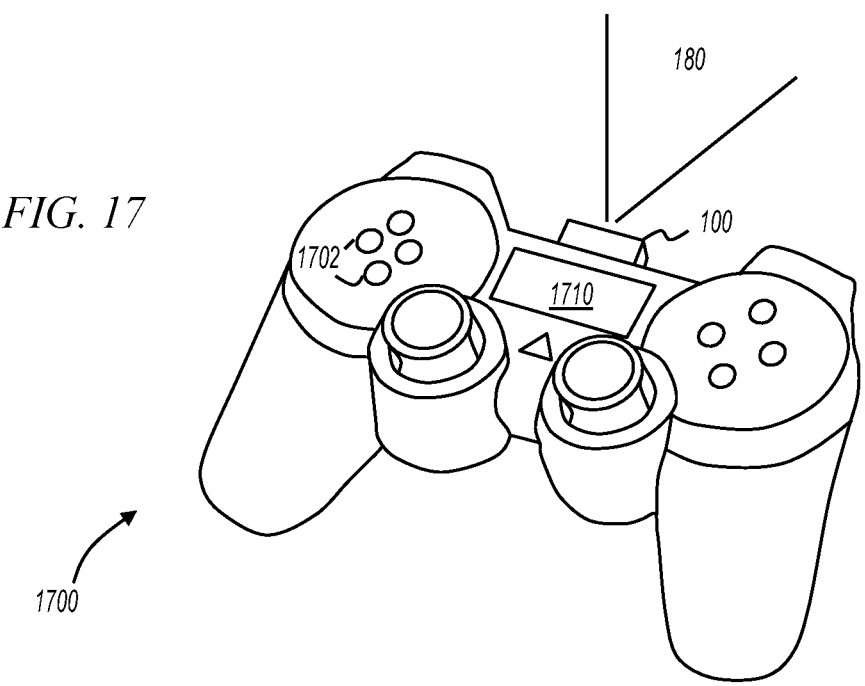
FIG. 17 shows a gaming apparatus in accordance with various embodiments of the present invention.

FIG. 17 shows a gaming apparatus in accordance with various embodiments of the present invention. Gaming apparatus 1700 includes buttons 1702, display 1710, and projector 100. In some embodiments, gaming apparatus 1700 is a standalone apparatus that does not need a larger console for a user to play a game. For example, a user may play a game while watching display 1710 and/or the projected content at 180. In other embodiments, gaming apparatus 1700 operates as a controller for a larger gaming console. In these embodiments, a user may watch a larger screen tethered to the console in combination with watching display 1710 and/or projected content at 180.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning laser projector comprising:
   at least one source of laser light;
   a scanning mirror to reflect the laser light, the scanning mirror having a position sensor to provide a position feedback signal in response to movement of the scanning mirror at a resonant frequency; and
   a parameter estimation circuit to predict a position of the scanning mirror between zero crossings of the position feedback signal, the parameter estimation circuit including a resonant analog anti-aliasing filter having a 3 dB bandwidth of at least ten times the resonant frequency of the scanning mirror, an analog-to-digital converter, and a digital filter chain to isolate spectral content at the resonant frequency of the scanning mirror.

2. The scanning laser projector of claim 1 wherein the analog anti-aliasing filter has a 3 dB bandwidth at least 30 times the resonant frequency of the scanning mirror.

3. The scanning laser projector of claim 1 further comprising a unity gain wideband buffer coupled between the position sensor and the analog anti-aliasing filter.

4. The scanning laser projector of claim 1 wherein the digital filter chain comprises a digital anti-aliasing filter.

5. The scanning laser projector of claim 4 wherein the digital filter chain further comprises a digital down-sampler, a digital bandpass filter, and a digital up-sampler.

6. The scanning laser projector of claim 1 further comprising a zero crossing estimator responsive to the digital filter chain.

7. The scanning laser projector of claim 1 further comprising a peak amplitude estimator responsive to the digital filter chain.

\* \* \* \* \*